United States Patent
Rojas Restrepo et al.

(10) Patent No.: US 9,877,612 B2
(45) Date of Patent: Jan. 30, 2018

(54) BLENDER JAR, BLENDER BASE UNIT AND BLENDER

(71) Applicant: Aktiebolaget Electrolux, Stockholm (SE)

(72) Inventors: Monica Maria Rojas Restrepo, Stockholm (SE); Johann Zita, Stockholm (SE)

(73) Assignee: Aktiebolaget Electrolux, Stockholm (SE)

(*) Notice: Subject to any disclaimer, the term of this patent is extended or adjusted under 35 U.S.C. 154(b) by 325 days.

(21) Appl. No.: 14/441,589

(22) PCT Filed: Nov. 9, 2012

(86) PCT No.: PCT/EP2012/072301
§ 371 (c)(1),
(2) Date: May 8, 2015

(87) PCT Pub. No.: WO2014/071994
PCT Pub. Date: May 15, 2014

(65) Prior Publication Data
US 2015/0289723 A1  Oct. 15, 2015

(51) Int. Cl.
A47J 43/07 (2006.01)
A47J 43/046 (2006.01)
A47J 43/08 (2006.01)

(52) U.S. Cl.
CPC ......... *A47J 43/0727* (2013.01); *A47J 43/046* (2013.01); *A47J 43/085* (2013.01)

(58) Field of Classification Search
CPC ...... A47J 43/046; A47J 43/0716; A47J 36/34; A47J 43/0722; A47J 43/085
See application file for complete search history.

(56) References Cited

U.S. PATENT DOCUMENTS

| 1,809,363 | A | * | 6/1931 | Teare | A47J 43/046 |
|---|---|---|---|---|---|
| | | | | | 241/100 |
| 3,064,949 | A | | 11/1962 | Dewenter | |
| 3,542,178 | A | | 11/1970 | Ripple | |
| 3,596,692 | A | | 8/1971 | Swanke | |
| 4,200,244 | A | | 4/1980 | Sontheimer | |
| 4,260,267 | A | | 4/1981 | Walton | |

(Continued)

FOREIGN PATENT DOCUMENTS

| BR | 199016265 | 4/1999 |
|---|---|---|
| CN | 100502745 C | 6/2009 |

(Continued)

OTHER PUBLICATIONS

First Chinese Office Action for Chinese Application No. 201380058837.5, dated Dec. 27, 2016, including English translation, 16 pages.

(Continued)

*Primary Examiner* — Tony G Soohoo
(74) *Attorney, Agent, or Firm* — RatnerPrestia

(57) ABSTRACT

A blender jar for a household type blender. The blender jar includes a jar and a blender blade assembly provided rotatably around a rotary axis at a bottom of the blender jar. The rotary axis is tilted from a normal axis of a working surface used for operating the blender jar thereon in ordinary use.

13 Claims, 3 Drawing Sheets

(56) References Cited

U.S. PATENT DOCUMENTS

| | | | |
|---|---|---|---|
| 4,892,413 A | 1/1990 | Vats |
| 5,273,358 A | 12/1993 | Byrne |
| 5,322,357 A | 6/1994 | Mazer |
| 5,584,577 A | 12/1996 | Thies |
| 5,957,577 A | 9/1999 | Dickson |
| 6,523,993 B2 | 2/2003 | Williams |
| 6,680,551 B2 | 1/2004 | Bates |
| 6,715,706 B1 | 4/2004 | Planca |
| 6,974,099 B2 | 12/2005 | Kolar |
| 7,063,456 B2 | 6/2006 | Miller |
| 7,217,028 B2 | 5/2007 | Beesley |
| 7,267,478 B2 | 9/2007 | Miller |
| 7,350,963 B2 | 4/2008 | Williams |
| 7,387,269 B2 | 6/2008 | Mally |
| 7,422,361 B2 | 9/2008 | Pryor, Jr. |
| 7,445,171 B2 | 11/2008 | Areh |
| 8,056,848 B1 | 11/2011 | Liang |
| 8,087,603 B2 | 1/2012 | Kolar |
| 8,132,752 B1 | 3/2012 | Hotaling |
| 9,186,022 B1 | 11/2015 | Jacobsen |
| 2002/0141285 A1 | 10/2002 | Williams |
| 2002/0176320 A1 | 11/2002 | Wulf |
| 2004/0206837 A1 | 10/2004 | Lee |
| 2005/0099884 A1 | 5/2005 | Lee |
| 2005/0255201 A1 | 11/2005 | Gruhot |
| 2006/0176765 A1* | 8/2006 | Pryor, Jr. ............. A47J 43/046 366/192 |
| 2006/0176768 A1 | 8/2006 | Williams |
| 2006/0208119 A1 | 9/2006 | Mally |
| 2007/0133347 A1 | 6/2007 | Mok |
| 2009/0114616 A1 | 5/2009 | White |
| 2009/0193982 A1 | 8/2009 | Chou |
| 2009/0238034 A1 | 9/2009 | Ulanski |
| 2010/0014380 A1 | 1/2010 | Kolar |
| 2010/0038462 A1 | 2/2010 | Kolar |
| 2010/0071219 A1 | 3/2010 | Lin |
| 2012/0091245 A1 | 4/2012 | Menashes |
| 2012/0199682 A1 | 8/2012 | Lee |
| 2013/0077433 A1 | 3/2013 | Conti |

FOREIGN PATENT DOCUMENTS

| | | |
|---|---|---|
| CN | 201279085 | 7/2009 |
| CN | 101558965 | 10/2009 |
| CN | 102144899 | 8/2011 |
| DE | 1037088 | 8/1958 |
| DE | 4238578 | 5/1994 |
| DE | 20219341 | 2/2003 |
| EP | 0131548 A2 | 1/1985 |
| EP | 2486833 | 8/2012 |
| FR | 2605207 | 4/1988 |
| GB | 1461469 | 1/1977 |
| JP | 2003144956 | 5/2003 |
| KR | 2002069705 | 9/2002 |
| MU | 77019482 | 3/1999 |
| MU | 81023561 | 12/2003 |
| MU | 83033378 | 12/2004 |
| WO | 2074882 | 11/1981 |
| WO | 2004103538 | 12/2004 |
| WO | 2006084055 | 8/2006 |
| WO | 2007028198 | 3/2007 |
| WO | 2008101148 | 8/2008 |
| WO | 2009121154 | 10/2009 |
| WO | 2012075522 | 6/2012 |

OTHER PUBLICATIONS

Entire patent prosecution history of U.S. Appl. No. 12/935,767, filed Dec. 22, 2010, entitled, "Silent Blender," now U.S. Pat. No. 8,579,220, issued Nov. 12, 2013.

Office Action for European Patent Application No. 10 822 924.6 dated Jan. 27, 2015.

Entire patent prosecution history of U.S. Appl. No. 13/501,809, filed Jun. 7, 2012, entitled, "Support for Blender Blades."

Entire patent prosecution history of U.S. Appl. No. 14/441,601, filed May 8, 2015, entitled, "Blender Blade Assembly and Blender."

International Search Report for International Application No. PCT/EP2012/072298 dated Oct. 21, 2013.

International Search Report for International Application No. PCT/EP2013/057039 dated Oct. 22, 2013.

Entire patent prosecution history of U.S. Appl. No. 14/441,596, filed May 8, 2015, entitled, "Blender Jar, Blender Base Unit and Blender."

International Search Report for International Application No. PCT/EP2013/057041 dated May 10, 2013.

International Search Report for International Application No. PCT/EP2012/072301 dated Jul. 1, 2013.

Chinese Office Action for Chinese Application No. 201380058454. 8, 9 pages.

Non Final Office Action for U.S. Appl. No. 14/441,601, dated Jan. 12, 2017, 18 pages.

Chinese Office Action for Chinese Application No. 201280076948. 4, dated Apr. 5, 2017 with translation, 19 pages.

European Communication Under Rule 71(3) EPC for European Application No. 13713903.6, dated Apr. 4, 2017, 8 pages.

Final Office Action for U.S. Appl. No. 14/441,601, dated Jun. 22, 2017, 20 pages.

European Communication for European Application No. 13 713 904.4, dated Aug. 31, 2017, 4 pages.

Non Final Office Action for U.S. Appl. No. 14/441,596, dated Oct. 10, 2017, 34 pages.

Chinese Second Office Action for Chinese Application No. 201380058837.5, dated Aug. 9, 2017, including English translation, 14 pages.

* cited by examiner

BLENDER JAR, BLENDER BASE UNIT AND BLENDER

This application is a U.S. National Phase application of PCT International Application No. PCT/EP2012/072301, filed Nov. 9, 2012, the entire disclosure of which is expressly incorporated by reference herein.

FIELD OF THE INVENTION

The present invention is directed to a blender jar for a household type blender, a corresponding blender base unit and blender of household type.

BACKGROUND OF THE INVENTION

Current household or domestic blenders or mixers in the market need to deal with different ingredients and recipes and be capable of liquefying, mixing and producing different textures. In most of cases, the performance of the blenders is measured in the final particle size after processing during a certain period of time.

Therefore, the circulation inside the blender jar and the efficiency of the blades has a lot to do with achieving good results. One of the most difficult tasks when processing food in the blender or blender jar is having to process viscous ingredients or recipes, such as smoothies, milkshakes or slushies, because the circulating movement is reduced, and the demand of power and efficiency from the motor and blades is increased. The viscosity of such ingredients also reduces the suction carried by the vortex, and an air pocket can be formed above the blades, causing them to spin without processing nearby food.

To avoid the formation of air pockets and to enhance the circulating movement, it is known to use plungers by which the user can interact in a stirring movement and thus help to explode or remove the air pocket and to reestablish adequate circulating movement.

Further it is known to avoid or remove air pockets and enhance the circulating movement by improving the suction in the vortex, which can be obtained by increasing the speed of the blender blades or by adding more liquid to the mixture.

The aforementioned solutions bring unconformities to the user as in the first case, the user needs to intervene. In the second case, where in most cases rotational speeds of over 20,000 rpm are used, comparatively high noise levels, that are generally difficult to remove, are generated. And the third case the final result could be affected in quality of textures and flavor due to the addition of more liquid.

In U.S. Pat. No. 7,217,028 B2 a domestic blender with a tilted blender jar is described, wherein tilting the blender jar is thought to improve mixing and blending results.

Another issue identified on the performance of known domestic blenders for example is the formation of ice bridges below the blender blade during processing frozen items, such as ice cubes. In general this issue relates to the aggregation of particulate matter below the blender blade during operation.

As can readily be seen, there is still need for improving blending or mixing results and vortex generation of domestic blenders.

SUMMARY OF THE INVENTION

It is one of the objects of the present invention to solve the inconveniences observed with state of technology. In particular, it is an object of the invention to provide solutions for achieving improved blending, mixing and vortex generation in blender jars of domestic or household type blenders. In particular, a respective blender jar for a household type blender, blender base unit for a household type blender and blender of household or domestic type shall be provided.

This object is solved by claims 1, 7 and 9. Embodiments result from respective dependent claims.

According to claim 1, a blender jar for a household or domestic type blender, in particular a household or domestic type blender jar, is provided. The blender jar comprises a blender blade assembly, in particular a blender blade, which is attached rotatably around a rotary axis at a bottom of the blender jar. With the proposed blender jar, the rotary axis is tilted from a normal or perpendicular axis of a working surface used for operating the blender jar thereon in or during ordinary use.

The normal axis of the working surface in particular shall correspond to the surface-normal of a respective working surface. In case that the blender in normal or ordinary operation is positioned or placed on a horizontal working surface, which probably in most cases applies, the rotary axis is and will be tilted against the vertical direction.

It shall be noted, that the term "jar" in the sense of the present application in particular shall cover the terms "goblet", "jug" or "container". A blender jar in the sense of the present application in particular may be implemented as a portable type jar adapted to be manually operable, usable or handleable by a user. In particular, the jar may be adapted such that it can be removably placed or arranged on a corresponding blender base in a manual action of the user.

The tilt angle of the rotary axis may in particular be selected in dependence of a geometrical parameter of the blender jar. Such parameters are for example the diameter of the blender jar, in particular at a bottom, mid or upper section, the shape of the blender jar bottom, the shape of the blender jar side walls, the cross-sectional shape of the blender jar etc.

In one variant, it may be provided that the tilt angle of the rotary axis is adjustable within a certain angular range. In this variant, the tilt angle may be adjusted to the kind of ingredients to be processed within the blender jar.

It has been found out, that tilting the rotary axis leads to enhanced mixing and blending in ordinary operation of a respective blender. In particular, improved circulation movement and vortex generation within the blender jar can be obtained. Further, aggregation of particulate matter below the bender blade, in particular the formation of ice bridges, as well as air pockets can greatly be avoided. Therefore, processing of comestible goods and substances, such as foodstuff, beverages and/or comestible ingredients intended for preparing dishes, foodstuff and/or beverages and the like, can be greatly enhanced.

With a tilted arrangement of the rotary axis as proposed herein, it is further possible to improve the performance at lower rotational speeds of the blender blade, in particular due to the fact that the recirculation and circulating movement within the blender jar is improved. This in particular means that in the same amount of time, more ingredients reach the blades as compared to a non-tilted arrangement of the rotary axis.

Here, it shall be mentioned that the improvements in mixing, blending and circulating movement may be based on the combined action of the tilted drag and lift forces generated by the tilted blender blade and gravitational forces acting in vertical direction upon the substances, in particular comestible substances, within the blender jar.

According to an embodiment of the blender jar, it is advantageous to use a tilt angle by which the rotary axis is tilted from the normal axis in the range from 5 degrees to 20 degrees. The mentioned range of possible tilt angles has been proven optimal for obtaining excellent mixing and circulating movements for liquid, viscous and/or hard food-type ingredients.

In a further embodiment, a central axis of inner walls of the blender jar, i.e. a central axis of the blender jar, and the rotary axis are tilted from each other by an acute angle. The acute angle may lie in the range from 0 degrees to 20 degrees, in particular from 1 degree to 20 degrees. However, it is also possible, that the central axis and the rotary axis are aligned with each other, i.e. oriented collinear. In addition, the central axis of the blender jar and the rotary axis may be offset from each other, in particular relative to a plane parallel to the working surface.

Tilting the blender jar relative to the rotary axis may be used to optimize mixing and circulating movements for different blender jar geometries.

The angle by which the blender jar is tilted against the rotary axis may for example be selected in dependence of a geometrical parameter of the blender jar or respective blender jar walls, in particular but not restricted to diameter of the blender jar, cross-sectional shape of the blender jar and the like. Reference is made to corresponding parameters listed further above in connection with the tilt angle of the rotary axis, which are also applicable in the present case.

In a yet further embodiment, the bottom of the blender jar at which the blender blade is positioned has a rounded, in particular spherical, preferably semi-spherical, configuration or shape. Using such bottom geometries has been proven advantageous for obtaining optimal circulation movement in particular within, into and out of the blender jar bottom region in which the blender blade acts upon the ingredients. Advantageously, aggregation of particulate matter below the blender blade can be greatly avoided.

In an embodiment of the blender jar, a blender blade of the blender blade assembly has a trough-shaped vertical cross section. Such a shape in particular is advantageous for generating optimal circulating movements in blender jars having rounded, in particular spherical or semi-spherical bottom shapes.

In particular with the trough-shaped blender blade it may be provided that the blender blade has two arms respectively comprising in successive arrangement a base section, a wing section, angled upwards from the base section, and a winglet section provided at a distal end of the wing section. The wing section may be twisted for obtaining an adequate angle of attack.

The proposed blender blade geometry is of particular advantage for blender jar bottom shapes as mentioned above. Further, the blender blade shape and configuration are effective in generating optimal mixing and blending results and circulating movement with the tilted blender blade rotary axis.

In an embodiment, side walls of the blender jar are inclined against the central axis of the blender jar, in particular such that a cross section of the blender jar decreases towards the bottom of the blender jar. In this way, a funnel-shaped blender jar configuration can be obtained, which has proven optimal for tilted blender blade arrangements. In particular, the funnel-shaped blender jar facilitates optimal circulating movement and vortex generation.

In a yet further embodiment, the blender jar comprises a coupling interface adapted to couple the blender jar and blender blade assembly to a motorized base unit. It is provided that the coupling interface is adapted to be coupled to the motorized base unit at an angle from above. In particular, the coupling interface may be inclined to take account of the tilt arrangement of the rotary axis of the blender blade assembly. With the proposed geometry the blender jar can be put on or be coupled to the base unit in a movement, in particular a manual action of a user, directed diagonally downwards. Removing the blender jar from the base unit can be done in a movement diagonally upwards, preferably also in a manual action of a user.

Preferably, in coupling the blender jar to the base unit, a connection or connecting engagement between the blender blade assembly, in particular blender blade, and a drive shaft of a motor of the motorized base is automatically established.

Providing the interface as proposed above is an efficient way to implement a tilted rotary axis of the blender blade. In particular the drive shaft for the blender blade can be provided in a tilted arrangement in accordance with the tilt angle of the rotary axis, such that no gear or other transmission is required between the drive shaft and rotary axis.

According to claim 7, a blender base unit for a household type blender, is provided which comprises a motor for driving a blender blade assembly of a blender jar having a coupling interface, wherein the blender jar is implemented as described above. The blender base unit may be implemented as part of a moveable type domestic blender or mixer. As mentioned already above, the blender jar may be implemented to be handled manually by a user.

The proposed blender base unit comprises a coupling counter-interface which is adapted to be removably coupled, in particular in a manual user action, to the coupling interface of the blender jar. Preferably, the counter-interface is adapted to releasably latch the coupling interface of the blender jar in a downward movement at an angle from above. The counter-interface in particular may be inclined in accordance with the tilt angle of the rotary axis of the blender blade assembly and/or according the corresponding inclination of the coupling interface of the blender jar. This in particular means that the blender jar can be put on or coupled to the blender base in a movement directed diagonally downwards. Simultaneously to coupling the blender base and blender jar together, a drive shaft connected to a drive motor of the blender base may be coupled to the blender blade such that the blender blade can be rotated by the drive motor.

Regarding the proposed counter-interface, which may comprise for example a cylindrical connection portion, a normal axis of the counter interface, preferably is tilted with respect to the normal axis of the working surface in accordance with the tilt angle of the rotary axis. As to advantages, reference is made to the description above, in particular related to the blender jar comprising a corresponding coupling interface.

According to claim 9, a household or domestic type blender, in particular mixer, is provided which comprises a blender jar as described above and further above, including any embodiment and variant of the blender jar. The blender further comprises a blender base unit as described above. In accordance to the description above, the blender, blender jar and blender base unit are preferably implemented as a moveable domestic or household device, in which the blender jar and blender base unit advantageously are implemented to be removably or releasably coupled to or latched with each other. As to advantages and advantageous effects of the blender, which may also be designated as mixer, reference is made to the description above and further below.

BRIEF DESCRIPTION OF THE DRAWINGS

Embodiments of the invention will now be described in connection with the annexed figures, in which.

Unless otherwise mentioned, like elements are designated by like reference signs throughout the figures.

DETAILED DESCRIPTION

Figure 1:
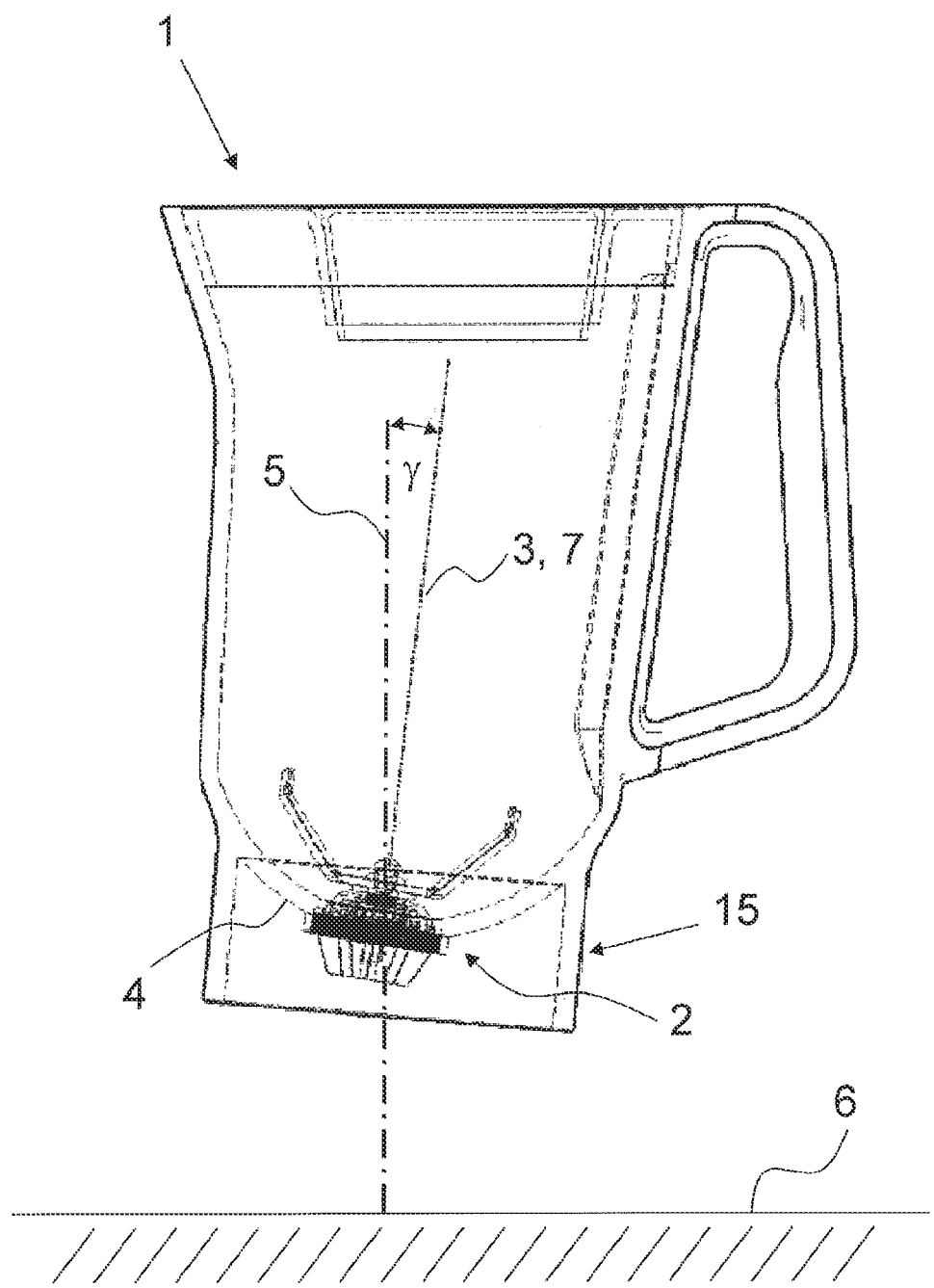
FIG. 1 schematically shows a broken-up side view of a blender jar.

FIG. 1 shows a blender jar 1 of a domestic blender or mixer, comprising a blender blade assembly 2. The blender blade assembly 2 is attached, rotatable around a rotary axis 3, to the bottom 4 of the blender jar 1.

The blender jar 1 is implemented as a handheld-type device, i.e. the blender jar 1 is manually handleable by a user. For manual handling or operation of the blender jar 1, it is provided that the blender jar 1 comprises a handle, which may for example be an integrated part of the blender jar 1.

The blender jar 1 as in particular shown in FIG. 1 is implemented as a type of container or vessel which is open at one end, in more detail, which has an axial opening at one axial end. The axial opening in the present case is arranged oppositely to the bottom 4. The blender jar 1 may comprise a lid for covering or closing the axial opening. The lid may be hingedly attached to a base body of the blender jar 1.

As can be seen from FIG. 1, in which the blender jar 1 is depicted in the orientation during ordinary operation, the rotary axis 3 of the blender blade assembly 2 is tilted from a normal axis 5 of a working surface 6 on which the blender jar 1 may and will be operated in ordinary use.

In general and in most cases, the working surface 6 will be represented by a horizontal plate or surface. In this case, the normal axis 5 is parallel to the vertical direction. However, using the term "normal axis of a working surface" shall account for the possibility that a respective working surface may be inclined, in particular slightly inclined, to the horizontal direction.

It has been found out that tilting the rotary axis 5 of the blender blade assembly 2 will lead to improved mixing and blending results. Further, better performance in mixing and blending can be obtained, in particular at lower rotational speeds of the blender blade.

The tilt angle $\gamma$, by which the rotary axis 3 of the blender blade or blender blade assembly 2 is tilted from the normal axis 5 lies in the range from 5 degrees to 20 degrees. Such angles have been identified to be advantageous for obtaining optimal mixing and blending as well as circulating movement within the blender jar 1.

In the present embodiment, a central axis 7 of the blender jar 1 essentially coincides with the rotary axis 3, i.e. the central axis 7 and rotary axis 3 are aligned.

However, in variants of the blender jar 1 the central axis 7 of the blender jar 1 and the rotary axis 3 may be misaligned, in particular tilted against each other.

In other variants, it is possible that the central axis 7 and the rotary axis 3 are displaced from each other. This in particular shall include variants, in which the blender blade assembly 2 is not centered within the blender jar 1.

Note, that in the present embodiment as depicted in FIG. 1, the blender blade assembly 2 is positioned and arranged centered within the blender jar 1.

A centered arrangement of the blender blade assembly 2, at least in the bottom region, in particular is advantageous for blender jars 1 having a rounded or spherical bottom 4, as is the case with the present embodiment.

Figure 2:
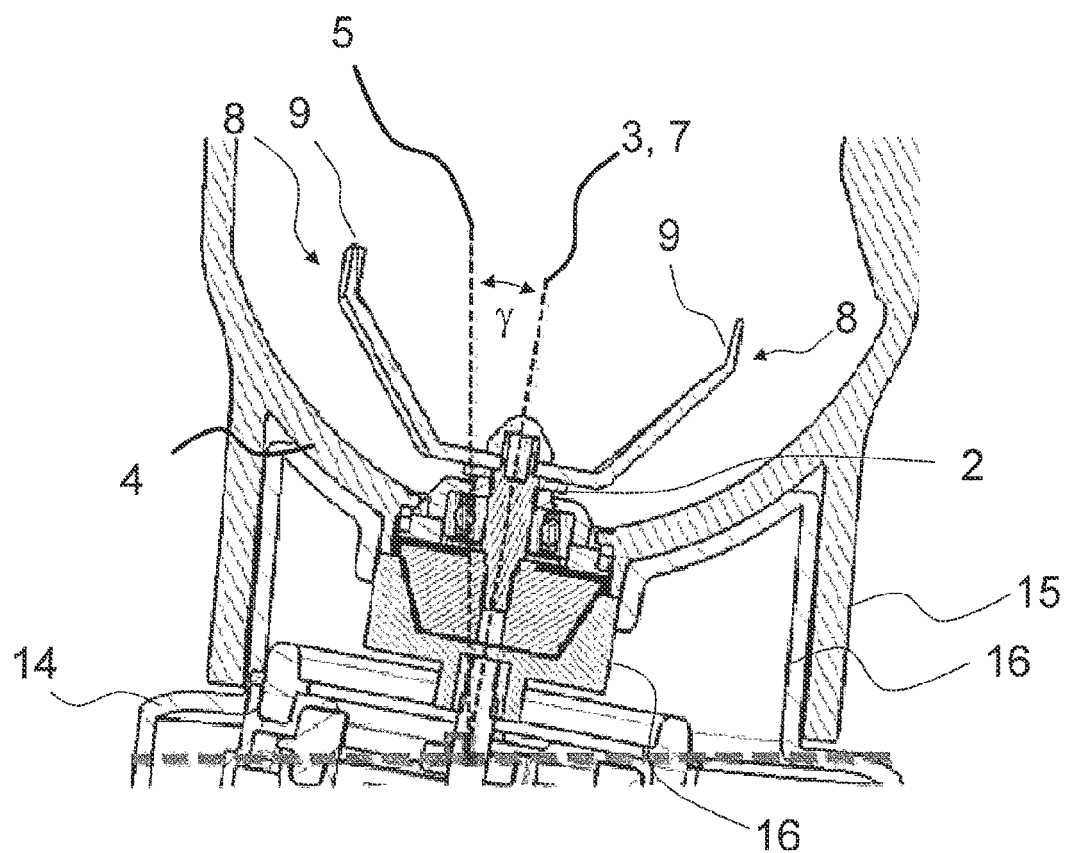
FIG. 2 shows a detail of the blender jar.

Details related to the blender jar bottom 4 and the tilt angle $\gamma$ can be seen in FIG. 2 showing an enlarged section of the blender jar 1 of FIG. 1. In particular it can be seen in FIG. 2 that the blender blade assembly 2 is centered within the blender jar 1, in particular centered within the bottom section of the blender jar 1.

With further reference to FIG. 2, it can be seen that a blender blade 8 of the blender blade assembly 2 has a trough-shaped vertical cross section. The blender blade 8 as shown in FIG. 2 comprises two blade arms 9. Each blade arm 9 comprises in a successive arrangement a base section, a wing section angled upwards from the base section, and a winglet section provided at a distal end of the wing section.

The proposed blender blade shape and design are of particular advantage for rounded and spherical bottom structures and shapes of the blender jar 1. The proposed blender blade 8 is effective in generating adequate and sufficient drag and lift forces to optimally mix and circulate ingredients within the blender jar.

The trough-shaped cross section of the blender blade 8 also has the advantage that the variations in the distances between the blender blade 8 and the bottom wall 4 of the blender jar 1 can be minimized or at least kept in a comparatively narrow range. This may inter alia lead to enhanced vortex generation and mixing.

Figure 3:
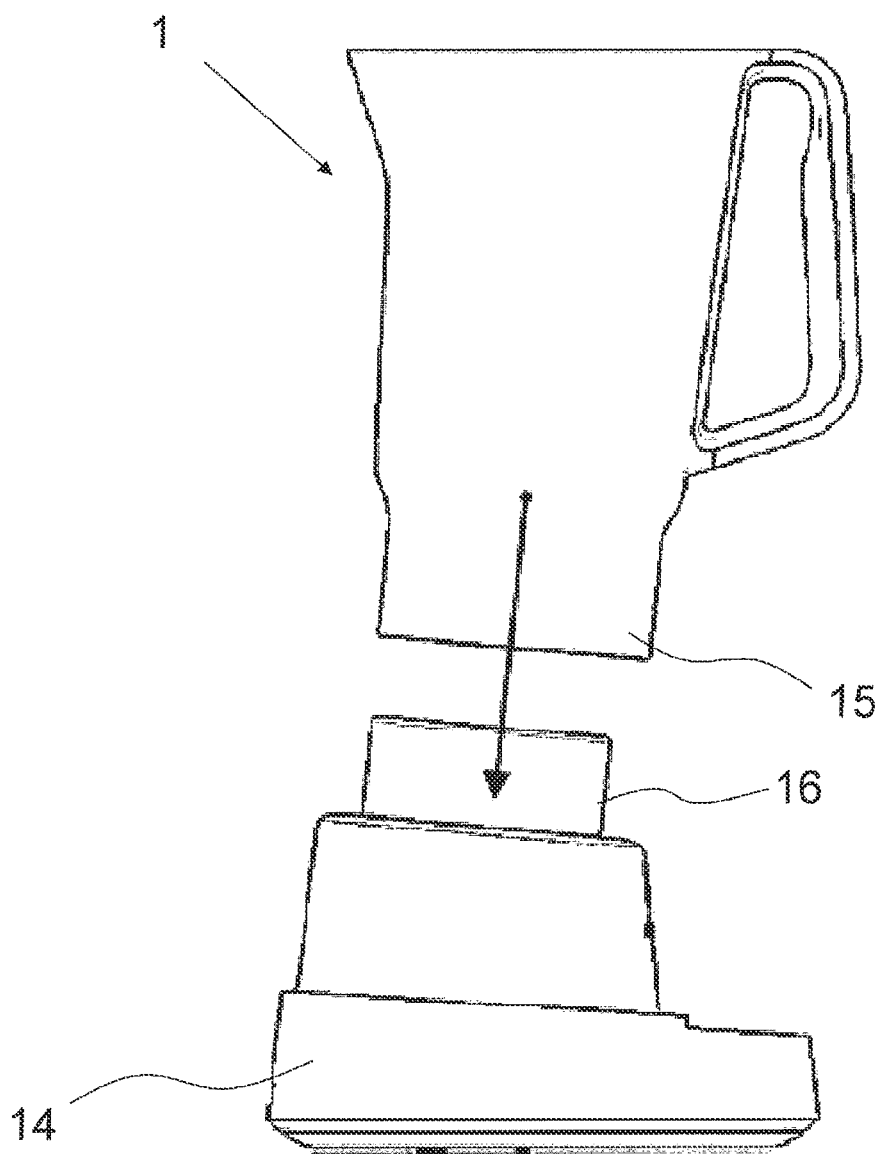
FIG. 3 shows the blender jar and a corresponding blender base unit.

Reference is now made to FIG. 1, 2 and also to FIG. 3 showing a domestic or household type, in particular mobile, blender with a blender jar 1 as previously described, and with a corresponding motorized base unit 14. The blender jar 1 comprises at its lower side a coupling interface 15 which is adapted and configured to removeably or releasably couple the blender jar 1 and blender blade assembly 2 to the base unit 14.

The blender base unit 14 comprises a counter-interface 16 adapted and designed for being coupled to or for establishing a coupling engagement with the coupling interface 15 of the blender jar 1.

The blender base unit 14 further comprises a motor (not shown) for driving the blender blade 8 in cases where the blender jar 1 is connected to the blender base unit 14. In more detail, a drive shaft connected to the drive motor can be coupled and latched to a corresponding shaft hole of the blender blade assembly 2 such that rotation of the drive motor can be transmitted to the blender blade 8. The orientation of the drive shaft essentially corresponds to the orientation of the rotary axis 3 of the blender blade 8, i.e. the drive shaft is tilted just as the rotary axis 3 of the blender blade assembly 2.

The counter-interface 16 of the blender base unit 14 and the coupling interface 15 of the blender jar 1 both are inclined with respect to the normal axis 5, provided that the blender, i.e. the blender base unit 14 and blender jar 1, is used in the ordinary operational orientation. Such an inclined configuration has the advantage that the blender jar 1 can be connected to the blender base unit 14 in a comparatively simple movement whilst connecting the twisted blender blade 2 to the twisted drive shaft of the motor.

As indicated in FIG. 3 by an arrow, connecting the blender jar 1 to the blender base unit 14 can be carried out in a downward movement at an angle from above, i.e. in a movement diagonally downwards. Removing the blender jar 1 from the blender base unit 14 requires a movement diagonally upwards. Respective movements of the blender jar 1 relative to the blender base unit 14 can be carried out by the user in an manual operation.

Using the inclined coupling interface 15 and counter-interface 16 has the advantage that the blender blade 8 can be directly connected to the drive shaft of the motor without requiring complex gears or transmissions to adapt the orientation of the axis of rotation of the motor to the inclined orientation of the rotary axis 3 of the blender blade assembly 2.

LIST OF REFERENCE NUMERALS

1 blender jar
2 blender blade assembly
3 rotary axis
4 bottom
5 normal axis
6 working surface
7 central axis
8 blender blade
9 blade arm
10 base section
11 wing section
12 winglet section
14 blender base unit
15 coupling interface
16 counter-interface
γ tilt angle

The invention claimed is:

1. A blender jar for a household type blender, the blender jar comprising:
   a jar; and
   a blender blade assembly rotatably mounted around a rotary axis at a bottom of the blender jar, wherein the rotary axis is tilted from a normal axis of a working surface upon which the blender jar is configured to operate in ordinary use;
   wherein a central axis of inner walls of the blender jar is tilted from the normal axis of the working surface, and the central axis of the inner walls of the blender jar and the rotary axis of the blender blade are tilted from each other by an acute angle.

2. The blender jar according to claim 1, wherein a tilt angle by which the rotary axis is tilted from the normal axis lies in the range from 5 degrees to 20 degrees.

3. The blender jar according to claim 1, wherein the bottom of the blender jar at which the blender blade assembly is mounted has a rounded configuration.

4. The blender jar according to claim 1, wherein side walls of the blender jar are inclined relative to a central axis of the blender jar, such that an axial cross section of the blender jar decreases towards the bottom of the blender jar.

5. The blender jar according to claim 1, further comprising a coupling interface configured to couple the blender jar and blender blade assembly to a motorized base unit, wherein the coupling interface is configured to be coupled to the motorized base unit from above at an angle tilted from the normal axis.

6. The blender jar according to claim 1, wherein the bottom of the blender jar surrounding the blender blade assembly defines a portion of a sphere.

7. A blender base unit for a household type blender, the blender base unit comprising:
   a motor for driving a blender blade assembly of a blender jar; and
   a coupling counter-interface configured to removeably receive a coupling interface of the blender jar at an angle relative to a normal axis of a working surface upon which the blender based unit is configured to operate in ordinary use;
   wherein a central axis of inner walls of the blender jar is tilted from the normal axis of the working surface, a blender blade assembly is rotatably mounted around a rotary axis at a bottom of the blender jar and the rotary axis is tilted from the normal axis of the working surface, and the central axis of the inner walls of the blender jar and the rotary axis of the blender blade are tilted from each other by an acute angle.

8. A blender of a household type, the blender comprising:
   a blender jar comprising:
      a jar, and
      a blender blade assembly rotatably mounted around a rotary axis at a bottom of the blender jar, wherein the rotary axis is tilted from a normal axis of a working surface upon which the blender jar is configured to operate in ordinary use, and
      a coupling interface; and
   a blender base unit comprising:
      a motor for driving a blender blade assembly of a blender jar; and
      a coupling counter-interface configured to removeably receive the coupling interface of the blender jar; and
   wherein a central axis of inner walls of the blender jar is tilted from the normal axis of the working surface, and the central axis of the inner walls of the blender jar and the rotary axis of the blender blade are tilted from each other by an acute angle.

9. The blender according to claim 8, wherein the coupling counter-interface is configured to removeably receive the coupling interface of the blender jar at an angle relative to the normal axis.

10. The blender according to claim 8, wherein a tilt angle by which the rotary axis is tilted from the normal axis lies in the range from 5 degrees to 20 degrees.

11. The blender according to claim 8, wherein the bottom of the blender jar at which the blender blade assembly is mounted has a rounded configuration.

12. The blender according to claim 8, wherein the bottom of the blender jar surrounding the blender blade assembly defines a portion of a sphere.

13. The blender according to claim 8, wherein side walls of the blender jar are inclined relative to a central axis of the blender jar, such that an axial cross section of the blender jar decreases towards the bottom of the blender jar.

* * * * *